US012811437B2

(12) United States Patent
An et al.

(10) Patent No.: US 12,811,437 B2
(45) Date of Patent: Nov. 24, 2026

(54) WIRELESS CHARGING CONTROL METHOD AND DEVICE, ELECTRONIC APPARATUS AND STORAGE MEDIUM

(71) Applicant: BEIJING XIAOMI MOBILE SOFTWARE CO., LTD., Beijing (CN)

(72) Inventors: Xufeng An, Beijing (CN); Yibo Xue, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 659 days.

(21) Appl. No.: 18/237,777

(22) Filed: Aug. 24, 2023

(65) Prior Publication Data

US 2024/0388133 A1 Nov. 21, 2024

(30) Foreign Application Priority Data

May 18, 2023 (CN) ........................ 202310565276.3

(51) Int. Cl.

| | |
|---|---|
| ***H02J 50/10*** | (2016.01) |
| ***G06F 1/26*** | (2006.01) |
| ***H02J 7/90*** | (2026.01) |
| ***H02J 50/80*** | (2016.01) |

(52) U.S. Cl.

CPC ................ *H02J 50/10* (2016.02); *G06F 1/26* (2013.01); *H02J 7/933* (2026.01); *H02J 50/80* (2016.02)

(58) Field of Classification Search

CPC .. H02J 50/10; H02J 7/933; H02J 50/80; H02J 7/42; H02J 7/60; G06F 1/26

USPC .......................................................... 320/108

See application file for complete search history.

(56) References Cited

U.S. PATENT DOCUMENTS

| | | | | |
|---|---|---|---|---|
| 7,656,129 | B2 * | 2/2010 | Banta | E06B 9/56 320/140 |
| 8,362,882 | B2 * | 1/2013 | Heubel | A41D 1/005 340/407.1 |
| 8,493,033 | B2 * | 7/2013 | Banta | E05F 15/603 320/141 |
| 9,818,530 | B2 * | 11/2017 | Muratov | H01F 38/14 |
| 10,374,450 | B2 * | 8/2019 | Kim | G06F 1/263 |
| 10,516,287 | B2 * | 12/2019 | Grange | H02J 50/10 |
| 10,530,168 | B2 * | 1/2020 | Zhang | H01M 10/4257 |
| 10,862,350 | B2 * | 12/2020 | Keeley | H01F 38/14 |

(Continued)

FOREIGN PATENT DOCUMENTS

| | | | | |
|---|---|---|---|---|
| CN | 206619960 U | * | 11/2017 | H01F 27/28 |
| EP | 3289664 B1 | * | 4/2021 | H04B 5/266 |
| WO | WO-2023141639 A1 | * | 7/2023 | H02J 7/82 |

OTHER PUBLICATIONS

European Patent Application No. 23196204.4, Search and Opinion dated Mar. 7, 2024, 8 pages.

*Primary Examiner* — M Baye Diao
(74) *Attorney, Agent, or Firm* — Cozen O'Connor

(57) ABSTRACT

A wireless charging control method includes: polling and detecting a present input current and a present input voltage in a wireless charging process performed between an electronic apparatus and a wireless charger; and performing wireless charging with the present input current and the present input voltage in response to the present input voltage being less than a preset threshold voltage, in which the preset threshold voltage is greater than a cutoff voltage, and the cutoff voltage represents a lower limit voltage for interrupting the wireless charging process.

17 Claims, 5 Drawing Sheets

(56) References Cited

U.S. PATENT DOCUMENTS

| | | | | |
|---|---|---|---|---|
| 11,289,938 | B2 * | 3/2022 | Wang | H02J 50/12 |
| 11,387,686 | B2 * | 7/2022 | Wan | H02J 50/10 |
| 11,495,401 | B2 * | 11/2022 | Keeley | H01F 38/14 |
| 11,707,996 | B2 * | 7/2023 | Waters | B60L 53/12<br>320/108 |
| 11,750,018 | B2 * | 9/2023 | Wan | H01M 10/44<br>320/108 |
| 2011/0221388 | A1 * | 9/2011 | Low | H02J 50/12<br>320/108 |
| 2014/0333145 | A1 * | 11/2014 | Lee | H02J 50/12<br>307/104 |
| 2019/0184842 | A1 | 6/2019 | Waters | |
| 2019/0222073 | A1 * | 7/2019 | Lee | H02J 50/80 |
| 2019/0280527 | A1 * | 9/2019 | Smith | A61M 60/538 |
| 2020/0251922 | A1 * | 8/2020 | Wang | H02J 50/12 |
| 2021/0006089 | A1 * | 1/2021 | Wan | H02J 50/10 |
| 2021/0313820 | A1 * | 10/2021 | Yang | H02J 50/10 |
| 2021/0396816 | A1 * | 12/2021 | Zominy | A24F 40/90 |
| 2021/0408846 | A1 * | 12/2021 | Wu | H02J 50/12 |
| 2022/0123598 | A1 * | 4/2022 | Wu | B60L 53/124 |
| 2022/0209577 | A1 * | 6/2022 | Hernandez | A61N 1/3787 |

* cited by examiner

WIRELESS CHARGING CONTROL METHOD AND DEVICE, ELECTRONIC APPARATUS AND STORAGE MEDIUM

CROSS-REFERENCE TO RELATED APPLICATION

This application is based on and claims priority to Chinese Patent Application No. 202310565276.3 filed on May 18, 2023, the entire content of which is incorporated herein by reference.

BACKGROUND

With the development of charging technology, wireless charging is becoming more and more popular in consumer electronics. At the same time, wireless chargers based on private protocols and electronic apparatuses supporting wireless charging, developed by various manufacturers, need to at least meet basic wireless charging modes such as Qi BPP or Qi EPP specified by WPC (Wireless Power Consortium).

SUMMARY

The present disclosure relates to the field of wireless charging technology, in particular to a wireless charging control method and device, an electronic apparatus, and a storage medium.

In a first aspect, embodiments of the present disclosure provides a wireless charging control method applied to an electronic apparatus. The wireless charging control method includes: polling and detecting a present input current and a present input voltage in a wireless charging process performed between an electronic apparatus and a wireless charger; and performing wireless charging with the present input current and the present input voltage in response to the present input voltage being less than a preset threshold voltage, in which the preset threshold voltage is greater than a cutoff voltage, and the cutoff voltage represents a lower limit voltage for interrupting the wireless charging process.

In a second aspect, embodiments of the present disclosure provide an electronic apparatus, including: a processor; and a memory having stored therein a computer instruction that is configured to cause the processor to poll and detect a present input current and a present input voltage in a wireless charging process performed between an electronic apparatus and a wireless charger; and performing wireless charging with the present input current and the present input voltage in response to the present input voltage being less than a preset threshold voltage, in which the preset threshold voltage is greater than a cutoff voltage, and the cutoff voltage represents a lower limit voltage for interrupting the wireless charging process.

In a third aspect, embodiments of the present disclosure provide a storage medium having stored therein an instruction that is configured to cause a computer to poll and detect a present input current and a present input voltage in a wireless charging process performed between an electronic apparatus and a wireless charger; and performing wireless charging with the present input current and the present input voltage in response to the present input voltage being less than a preset threshold voltage, in which the preset threshold voltage is greater than a cutoff voltage, and the cutoff voltage represents a lower limit voltage for interrupting the wireless charging process.

BRIEF DESCRIPTION OF DRAWINGS

Accompanying drawings involved in description on embodiments or the related art will be described briefly below, in order to describe technical solutions in the embodiments of the present disclosure or in the related art more clearly. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
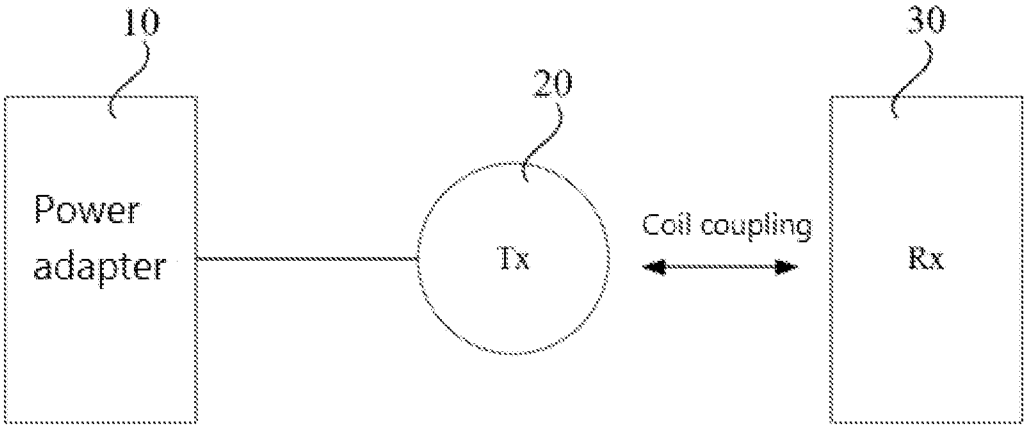
FIG. 1 is a schematic view of an electronic apparatus and a wireless charger according to some embodiments of the present disclosure.

Technical solutions of the present disclosure will be clearly and completely described below with reference to the accompanying drawings. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure. In addition, the technical features involved in different embodiments of the present disclosure described below may be combined with each other without any conflict.

With the development of charging technology, wireless charging has become a standard feature in consumer electronics. In order to normalize wireless charging standards, WPC (Wireless Power Consortium) has launched the Qi wireless charging standard, and wireless chargers and electronic apparatuses supporting wireless charging, developed by various manufacturers, must be authenticated by Qi protocol.

The Qi protocol authentication mainly includes Qi BPP authentication and Qi EPP authentication. The Qi BPP authentication can support wireless charging with power of 5 W and below, while the Qi EPP authentication can support wireless charging with power above 5 W. Various manufacturers can develop their own high-power wireless charging private protocols based on the Qi protocol. For example, current wireless charging power based on private protocols has reached 65 W or even higher.

However, such high-power wireless charging needs to be authenticated by their own private protocols. Regarding cross compatibility among wireless chargers and electronic apparatuses from various manufacturers, generally only low-power basic wireless charging modes such as BPP 5 W or EPP 10 W can be realized. For example, when wireless charging is carried out between a wireless charger developed by Company A and a mobile phone supporting wireless charging function developed by Company A, a wireless fast charging power of 65 W can be achieved through a private protocol. However, when wireless charging is carried out between a wireless charger developed by Company A and a mobile phone developed by Company B, only low-power basic wireless charging modes such as BPP 5 W or EPP 10 W stipulated by the Qi protocol can be adopted due to the inability to adapt to private protocols.

At present, manufacturers' research and development as well as optimization for wireless charging mainly focus on the development and optimization of high-power modes of their own private protocols, with little attention to the optimization of basic power modes such as BPP 5 W or EPP 10 W.

In the related art, when using a basic power mode for wireless charging, there is no need for a complicated charging algorithm, and generally it is only necessary to set input voltage and input current via software, to make a charging power reach a target power. As an example, for BPP 5 W, the input voltage is typically set to 6V and the input current is limited to about 830 mA, so that the input power is about 4.98 W, in which way the wireless charging is maintained.

However, it is found through research that this wireless charging control method is prone to situations where the charging is interrupted or disenabled. For example, if a coil of the wireless charger is not completely aligned with a coil of the electronic apparatus, or magnetic charging is interfered with by magnetic parts, the coupling performance of the charging coils is poor, which makes the input voltage at the electronic apparatus terminal fail to reach a required voltage. In such a case, if the input current is still set in the above way, the input voltage will be lowered below a cutoff voltage, which leads to interruption of wireless charging.

In the above example of BPP 5 W, due to poor coil coupling performance, if the input current is still limited to 830 mA, the input voltage is likely to drop below 4.8V. To ensure the stability of the charging process, a cutoff voltage is set. When the input voltage is less than the cutoff voltage, the wireless charging process will be interrupted. In this example, the cutoff voltage is 4.8V, and when the input voltage drops below 4.8V, the wireless charging process will be interrupted, showing a charging failure.

Directed at the defects of the above related art, embodiments of the present disclosure provide a wireless charging control method and device, an electronic apparatus and a storage medium, aiming to improve the effectiveness and stability of wireless charging, ensuring normal wireless charging in case of poor coil coupling performance, and reducing the risk of charging interruption.

In a first aspect, embodiments of the present disclosure provide a wireless charging control method, which is applicable to an electronic apparatus. The present disclosure does not limit the type of the electronic apparatus, and the electronic apparatus may be any type suitable for implementation of the present disclosure, such as a smart phone and a tablet computer, which will not be elaborated in the present disclosure.

FIG. 1 shows a block diagram of an electronic apparatus and a wireless charger according to some embodiments of the present disclosure, and an application scenario of embodiments of the present disclosure will be described below with reference to FIG. 1.

As shown in FIG. 1, the wireless charger mainly includes a power adapter 10 and a Tx terminal 20. The power adapter 10 refers to a plug of the wireless charger connected to the mains supply, and includes some circuit modules for power conversion, such as AC/DC converters and buck circuits. The Tx terminal 20 refers to a wireless charging base of the wireless charger, and includes a wireless charging coil, an MCU (Microcontroller Unit) chip, and the like. Rx terminal 30 refers to the electronic apparatus, such as a mobile phone and a watch. The electronic apparatus terminal includes a wireless charging coil, a battery, an electrical component and the like.

When the electronic apparatus is being charged wirelessly, the electronic apparatus at the Rx terminal 30 is placed on the wireless charging base of the Tx terminal 20, so that the electronic apparatus and the wireless charging base, and their respective wireless charging coils are closely coupled (generally within 10 mm), realizing electromagnetic signal transmission based on the electromagnetic oscillation principle and achieving wireless charging.

In some embodiments, the Tx terminal 20 of the wireless charger is configured as a magnetic attraction type, and the Rx terminal 30 is provided with a corresponding magnetic member or a magnetic protective shell, so that the Tx terminal 20 and the Rx terminal 30 perform the wireless charging through magnetic attraction connection, which will not be elaborated in the present disclosure.

Figure 2:
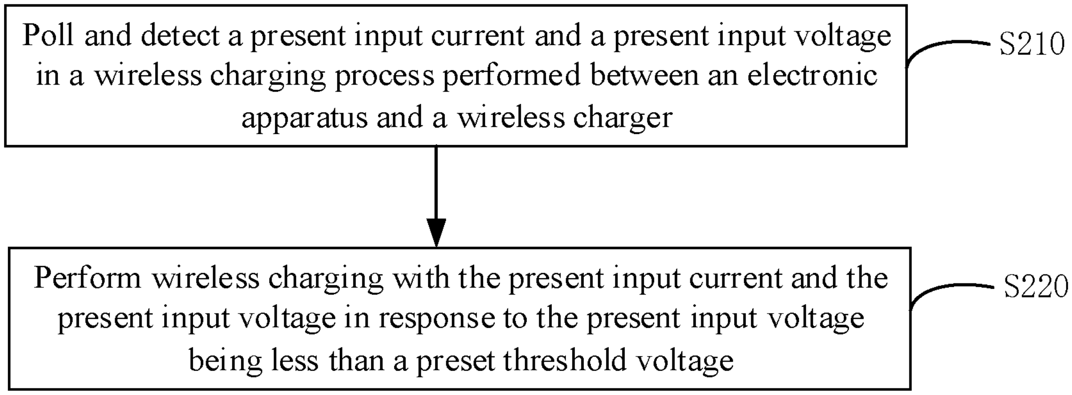
FIG. 2 is a flowchart of a wireless charging control method according to some embodiments of the present disclosure.

As shown in FIG. 2, in some embodiments, the wireless charging control method according to the present disclosure includes: S210: polling and detecting a present input current and a present input voltage in a wireless charging process performed between an electronic apparatus and a wireless charger; and S220: performing wireless charging with the present input current and the present input voltage in response to the present input voltage being less than a preset threshold voltage.

In combination with the foregoing description, it can be seen that the main reason for charging interruption is that the performance of coupling between the coils of the Tx terminal 20 and the Rx terminal 30 is poor, causing the input voltage to fail to reach the required voltage under normal conditions. If the charging is still carried out with a limit current configured under normal conditions, the input voltage will drop below the cutoff voltage, resulting in the charging interruption.

Therefore, in the embodiments of the present disclosure, the input current is not directly configured according to the limit current under normal conditions, but is gradually increased in a dynamic polling manner, and a steady state of wireless charging is determined based on changes in the input voltage. That is, when the input voltage is about to drop below the cutoff voltage, the input current is not further increased, and instead the present input current and the present input voltage are maintained to complete the subsequent wireless charging process.

It can be known from the foregoing description that the cutoff voltage refers to a lower limit voltage for interrupting the wireless charging process. If the input voltage during the wireless charging process is less than the cutoff voltage, the whole wireless charging process will be interrupted. Therefore, in the embodiments of the present disclosure, the preset threshold voltage is set based on the cutoff voltage, and the preset threshold voltage represents a critical voltage close to the cutoff voltage, so the preset threshold voltage is greater than the cutoff voltage. For example, the cutoff voltage is 4.8V, and the preset threshold voltage may be set to 5.0V.

It can be understood that if the input voltage in the wireless charging process is less than the preset threshold voltage, it means that the input voltage in the present wireless charging process is very close to the cutoff voltage; and if the input current continues increasing, it is likely to cause the input voltage to drop below the cutoff voltage, leading to the interruption of the whole wireless charging process.

Therefore, in the embodiments of the present disclosure, the input current is gradually increased in the dynamic polling manner. As the input current is gradually increased, the input voltage is gradually pulled down. When it is detected during a polling detection that the input voltage is pulled down below the preset threshold voltage, that is, the present input voltage is less than the preset threshold voltage, it indicates that the present input voltage is very close to the cutoff voltage, and if the input current continues increasing, the charging interruption is very likely to occur. Consequently, it is possible to stop increasing the input current, directly configure the present input current and present input voltage as the current and voltage for wireless charging, and maintain the present input current and the present input voltage to complete the subsequent wireless charging process.

In an embodiment of the present disclosure, taking BPP 5 W charging as an example, the traditional scheme is to directly set the input voltage to 6V and the input current to 830 mA for wireless charging. However, when the coil coupling performance is poor (for example, the coils are misaligned), if the input current continues to maintain 830 mA, the input voltage is likely to drop below the cutoff voltage of 4.8V, resulting in charging interruption.

However, in the embodiments of the present disclosure, similarly in the case of poor coil coupling performance (for example, the coils are not aligned), the input current is gradually increased, and the present input current and the present input voltage are dynamically polled. According to the formula of power W=IU, as the input current I gradually increases, the input voltage U gradually decreases. When the input voltage U decreases to be less than the preset threshold voltage 5.0V, the input current will not continue increasing. At this time, the present input current may be only 600 mA and the present input voltage is 4.9V; and the wireless charging continues with 600 mA and 4.9V.

It can be seen that in the same charging scenario where the coils are aligned or the coil coupling performance is poor due to magnetic interference, the traditional scheme of directly configuring the input voltage and input current easily leads to charging interruption. However, in the embodiments of the present disclosure, even if the coil coupling performance is poor, the wireless charging process can still be maintained to ensure the normal wireless charging of the electronic apparatus.

As known from the above description, in the embodiments of the present disclosure, by dynamically polling the current and the voltage in the wireless charging process, when the present input voltage is less than the preset threshold voltage, the subsequent wireless charging process is configured to continue with the present input current and the present input voltage. As a result, the wireless charging can still be carried out even when the coil coupling performance is poor, which reduces the risk of charging interruption, and improves the wireless charging effectiveness and stability.

Figure 3:
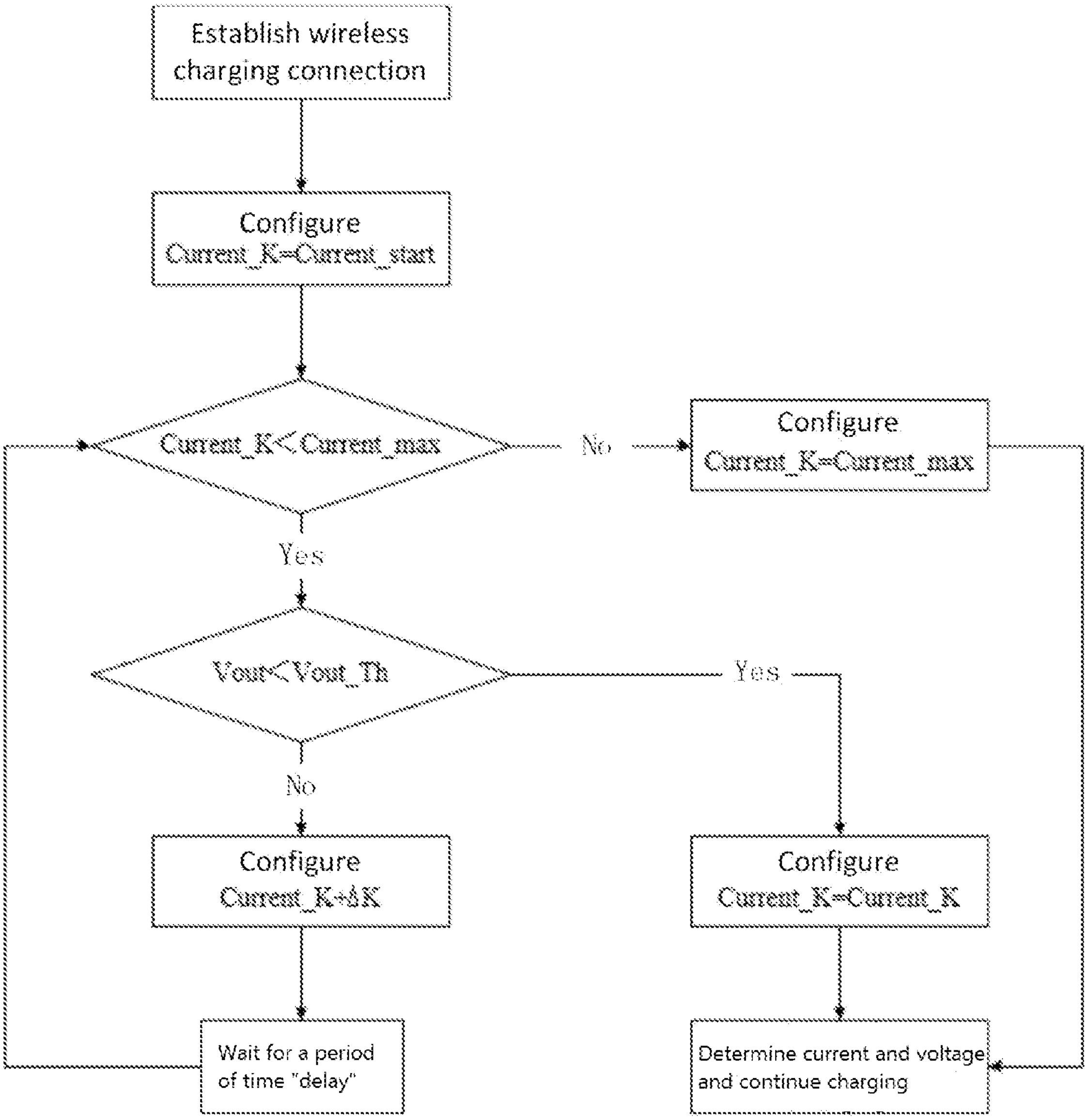
FIG. 3 is a logical diagram of a wireless charging control method according to some embodiments of the present disclosure.

FIG. 3 shows a logic diagram of a wireless charging control method according to some embodiments of the present disclosure, which will be described below with reference to FIG. 3.

As shown in FIG. 3, first, the electronic apparatus establishes a wireless charging connection with the wireless charger. It should be noted that in the embodiments of the present disclosure, there is no restriction on the mode and power of wireless charging connection. For example, the wireless charging mode may be Qi BPP mode or Qi EPP mode, and the wireless charging power may be 5 W, 10 W, 15 W, etc., which will not be elaborated in the present disclosure.

For the ease of understanding, a BPP 5 W charging process will be described as an example. In this example, the cutoff voltage for BPP 5 W charging is 4.8V, the preset threshold voltage Vout_Th is 5.0V, and the preset limit current Current_max is 830 mA. The preset limit current Current_max represents an upper limit value of the current during the wireless charging process, that is, a maximum input current cannot exceed the preset limit current Current_max.

Referring to FIG. 3, in the embodiments of the present disclosure, at the beginning of establishing the wireless charging connection, the present input current Current_K is configured to be equal to an initial current Current_start. It can be understood that in a charging control process according to the embodiments of the present disclosure, the input current is gradually increased in a polling manner. Thus, at the beginning of charging, it is possible to set a smaller charging current, which is the initial current Current_start as described in the present disclosure.

As another example, the initial current Current_start is set to 100 mA. Those skilled in the art can understand that the initial current Current_start may also be set to other values, which is not limited to the examples described herein, as long as the initial current Current_start is less than the preset limit current Current_max.

Next, during each polling detection process, it is judged whether the present input current Current_K is less than the preset limit current Current_max.

If the present input current Current_K is not less than the preset limit current Current_max, it indicates that the present input current Current_K has reached the preset limit current Current_max. Since the preset limit current Current_max represents the upper limit value of the current during the wireless charging process, that is, the maximum input current can only be the preset limit current Current_max, the input current cannot continue increasing. At this time, the input current Current_K can be configured to be equal to Current_max (i.e., Current_K=Current_max), and the input voltage at this time is used as the input voltage for subsequent wireless charging, to continue the subsequent wireless charging process.

If the present input current Current_K is less than the preset limit current Current_max, it indicates that the present input current Current_K has not reached the preset limit current Current_max, and the present input current can still be increased in theory. However, according to the foregoing description, in a situation with poor coupling performance, if the present input current Current_K continues increasing, the present input voltage Vout may drop below the cutoff voltage, resulting in charging interruption.

Therefore, in the embodiments of the present disclosure, when it is determined that the present input current Current_K is less than the preset limit current Current_max, it is then judged whether the present input voltage Vout is less than the preset threshold voltage Vout_Th.

If the present input voltage Vout is less than the preset threshold voltage Vout_Th, it indicates that the present input voltage Vout is close to the cutoff voltage, and a further increased in the input current may easily cause the risk of charging interruption. In an example where the preset threshold voltage Vout_Th is 5.0V, when the present input voltage Vout is 4.9V, Vout is less than Vout_Th, but if the input current continues increasing, the input voltage will easily drop below the cutoff voltage of 4.8V, resulting in charging interruption. Therefore, in this case, the present input current Current_K will not be further increased, that is, the input current of wireless charging is configured as Current_K=Current_K, and the input voltage at this time is used as the input voltage for subsequent wireless charging, to continue the subsequent wireless charging process.

If the present input voltage Vout is not less than the preset threshold voltage Vout_Th, it indicates that the present input voltage Vout is far from the cutoff voltage, and even if the input current continues increasing, it will not cause the risk of charging interruption. At this time, it can be configured to increase a preset increment value ΔK based on the present input current Current_K, that is, to increase the present input current from Current_K to Current_K+ΔK.

After the present input current is increased by the preset increment value ΔK, the next polling cycle starts after waiting for a period of time (which is denoted by "delay"). In the next polling cycle, it is judged whether the present input current Current_K is less than the preset limit current Current_max and whether the present input voltage Vout is less than the preset threshold voltage Vout_Th, which means repeating the above process.

In combination with the example of FIG. 3, it can be understood that for the aforementioned BPP 5 W charging mode, in a situation with good coil coupling performance, even if the present input current Current_K rises to the preset limit current Current_max, the present input voltage Vout will not drop below the preset threshold voltage Vout_Th. In this situation, after several polling cycles, a value of the present input current Current_K will gradually increase to the preset limit current Current_max, and the present input current maintains Current_K=Current_max to continue the subsequent charging process.

In a situation with poor coil coupling performance, with the gradual polling increase of the present input current Current_K, the present input voltage Vout will drop below the preset threshold voltage Vout_Th in a certain polling cycle. At this time, to avoid the risk of charging interruption, the present input current Current_K cannot continue increasing, and hence the present input current Current_K and its corresponding present input voltage Vout are maintained to continue the subsequent charging process.

For example, the initial current Current_start is 100 mA and the preset increment value ΔK is 50 mA. After several rounds of polling detections, the present input current Current_K is equal to 650 mA, and the present input voltage Vout is equal to 4.9V, which is less than the preset threshold voltage Vout_th of 5.0V. At this time, the subsequent wireless charging can be configured to continue with 650 mA and 5.0V.

As known from the above examples, in the same situation, if the input current and the input voltage are directly configured using the traditional scheme, there is a high risk of charging interruption in the case of coil misalignment or magnetic interference. However, by using the control method according to the embodiments of the present disclosure, it can be detected in advance that the input voltage is about to drop below the cutoff voltage, so that the input current is not further increased, and current charging parameters are maintained to complete the subsequent wireless charging process, avoiding the risk of charging interruption.

In some embodiments of the present disclosure, a time interval "delay" between polling detections may range between 1 second to 2 seconds. For example, the time interval "delay" between polling detections is 1.5 seconds.

In some embodiments, considering potential voltage fluctuations in the charging process, for example, due to the interference from screen turn-on of the electronic apparatus and other factors, the present input voltage Vout, which is originally greater than the preset threshold voltage Vout_Th in a certain polling detection period, suddenly becomes less than the preset threshold voltage Vout_Th. In this case, according to the embodiments of FIG. 3, the present input current Current_K will not continue increasing, resulting in lower efficiency of the subsequent wireless charging.

In order to solve this problem, in other embodiments of the present disclosure, the above process is executed only when Vout<Vout_th is detected in n consecutive polling cycles, which will be explained in connection with embodiments of FIGS. 4 and 5.

Figure 4:
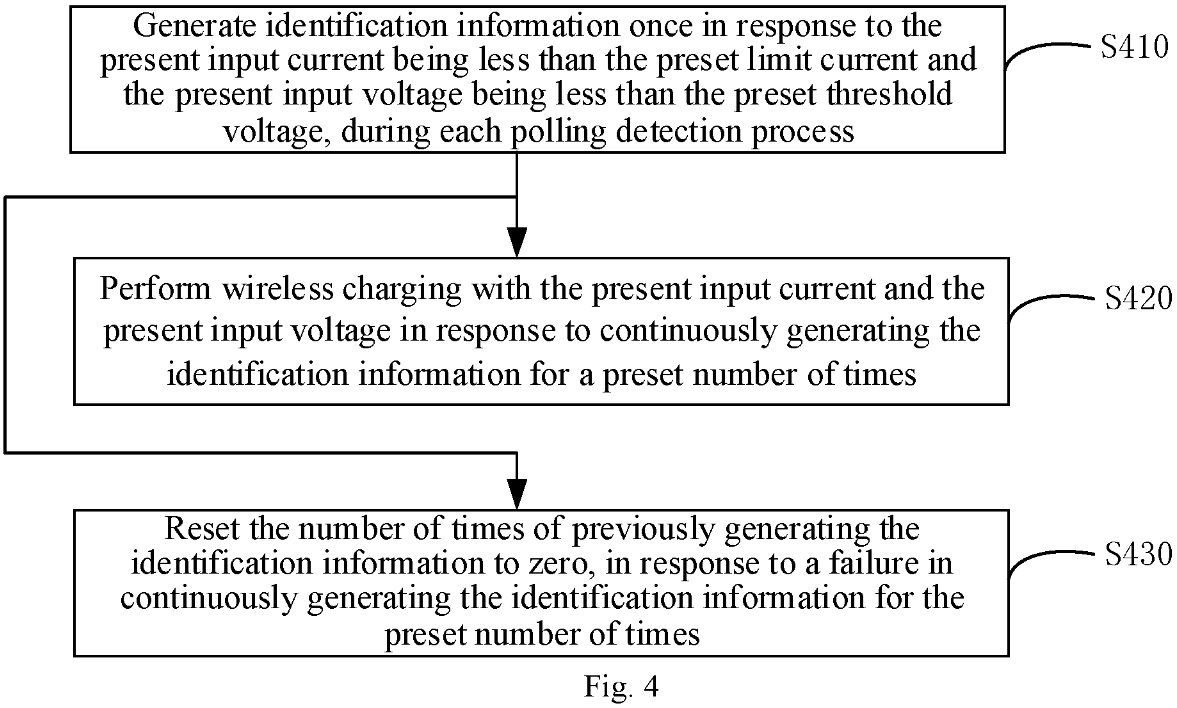
FIG. 4 is a flowchart of a wireless charging control method according to some embodiments of the present disclosure.

As shown in FIG. 4, in some embodiments, the wireless charging control method according to the present disclosure includes: S410: generating identification information once in response to the present input current being less than the preset limit current and the present input voltage being less than the preset threshold voltage, during each polling detection process; S420: performing wireless charging with the present input current and the present input voltage in response to continuously generating the identification information for a preset number of times; and S430: resetting the number of times of previously generating the identification information to zero, in response to a failure in continuously generating the identification information for the preset number of times.

Figure 5:
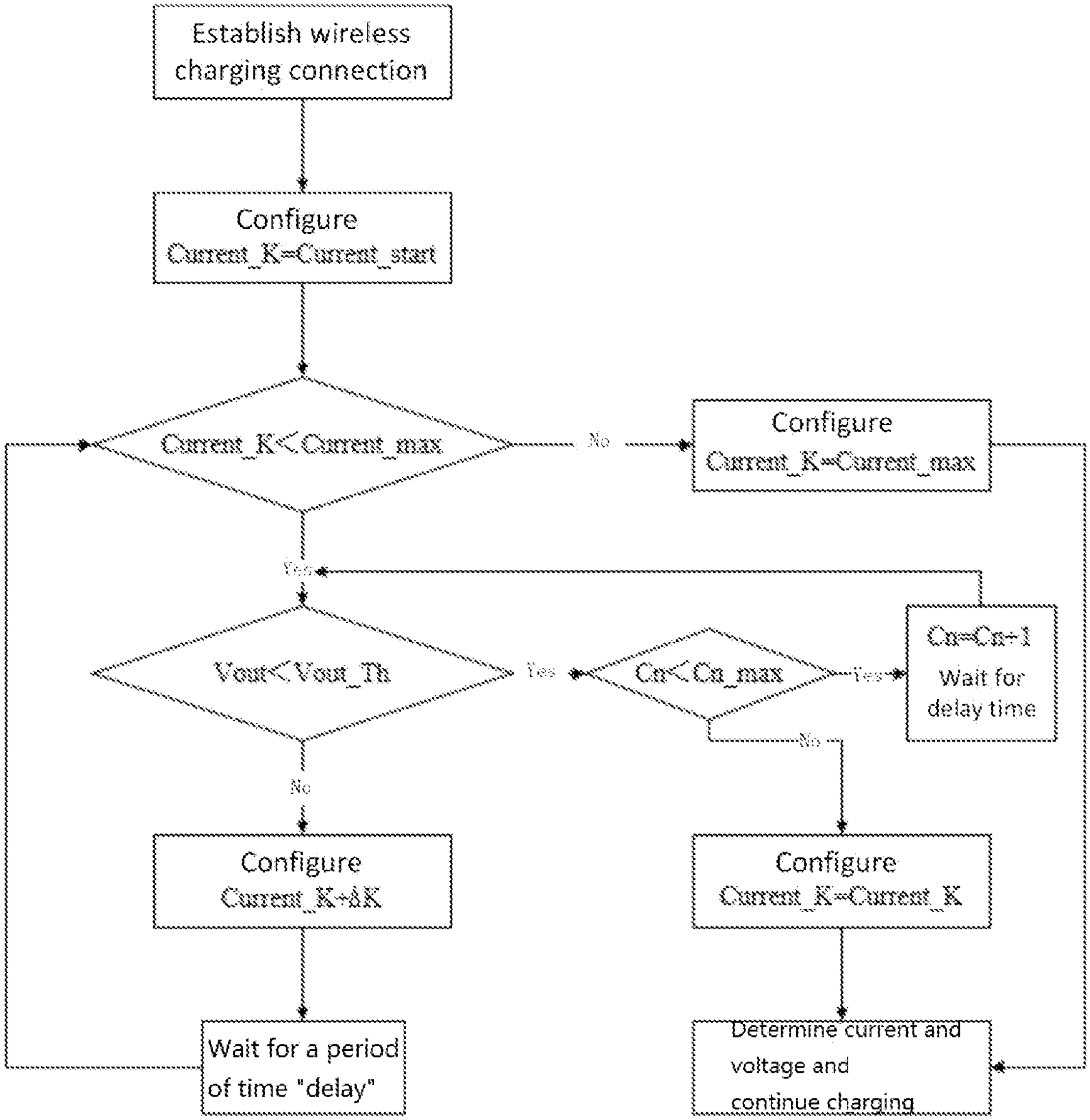
FIG. 5 is a logical diagram of a wireless charging control method according to some embodiments of the present disclosure.

As shown in FIG. 5, for example, in a polling cycle, it is detected that the present input current Current_K is less than the preset limit current Current_max, and the present input voltage Vout is less than the preset threshold voltage Vout_Th, that is, Current_K<Current_max and Vout<Vout_Th.

In these embodiments, instead of directly stopping increasing the present input current Current_K, the identification information is generated once, and the number of times Cn of generating the identification information is counted to judge whether the number of times Cn of generating the identification information reaches the preset number of times Cn_max.

If Cn is less than Cn_max, it indicates that this polling detection may be caused by voltage fluctuations, so add one to the number of times of generating the identification information, and wait until the next polling detection.

If the present input voltage Vout is less than the preset threshold voltage Vout_Th in consecutive polling cycles, and a value of Cn becomes equal to the preset number of times Cn_max with the continuous accumulation of the number of times Cn of generating the identification information, it indicates that Vout being less than Vout_th (i.e., Vout<Vout_Th) is not caused by voltage fluctuations. In such a case, it can be determined to stop increasing the present input current Current_K and configure to continue the subsequent wireless charging process still with the present input current Current_K.

If the present input voltage Vout is greater than the preset threshold voltage Vout_Th during a polling cycle, it indicates that Vout being less than Vout_th (i.e., Vout<Vout_Th) is caused by voltage fluctuations, and the present input current can continue increasing. At this time, the number of times Cn of previously generating the identification information can be reset to zero, i.e., making Cn equal to 0 (Cn=0).

In the embodiments of the present disclosure, there is no restriction on the specific value of the preset number of times Cn_max, which can be any positive integer suitable for implementation. For example, Cn_max is set to 5. That is, if Vout being less than Vout_th in five consecutive polling cycles, it can be determined to stop increasing the present input current Current_K and configure to continue the subsequent wireless charging process with the present input current Current_K, which will not be elaborated in the present disclosure.

In some embodiments of the present disclosure, a time interval "delay" between polling detections may range between 1 second to 2 seconds. For example, the time interval "delay" between polling detections is 1.5 seconds.

As known from the above description, in the embodiments of the present disclosure, by dynamically polling the current and the voltage in the wireless charging process, when the present input voltage is less than the preset threshold voltage, the subsequent wireless charging process is configured to continue with the present input current and the present input voltage. As a result, the wireless charging can still be carried out even when the coil coupling performance is poor. Hence, the risk of charging interruption is reduced, and the wireless charging effectiveness and stability are improved. Moreover, only when the present input voltage is less than the preset threshold voltage for consecutive preset times, the input current is not further increased, which reduces the risk of misjudgment and improves control accuracy and wireless charging efficiency.

In a second aspect, embodiments of the present disclosure provide a wireless charging control device, which is applicable to an electronic apparatus. The electronic apparatus is the Rx terminal 30 shown in FIG. 1. The present disclosure does not limit the type of the electronic apparatus, and the electronic apparatus may be any type suitable for implementation of the present disclosure, such as a smart phone and a tablet computer, which will not be elaborated in the present disclosure.

Figure 6:
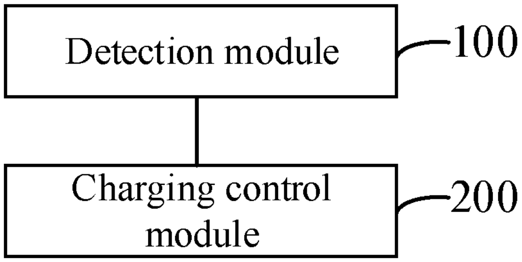
FIG. 6 is a block diagram of a wireless charging control device according to some embodiments of the present disclosure.

As shown in FIG. 6, in some embodiments, the wireless charging control device according to the present disclosure includes: a detection module 100 configured to poll and detect a present input current and a present input voltage in a wireless charging process performed between an electronic apparatus and a wireless charger; and a charging control module 200 configured to perform wireless charging with the present input current and the present input voltage in response to the present input voltage being less than a preset threshold voltage, in which the preset threshold voltage is greater than a cutoff voltage, and the cutoff voltage represents a lower limit voltage for interrupting the wireless charging process.

As known from the above description, in the embodiments of the present disclosure, by dynamically polling the current and the voltage in the wireless charging process, when the present input voltage is less than the preset threshold voltage, the subsequent wireless charging process is configured to continue with the present input current and the present input voltage. As a result, the wireless charging can still be carried out even when the coil coupling performance is poor, which reduces the risk of charging interruption, and improves the wireless charging effectiveness and stability.

In some embodiments, the charging control module 200 is configured to: increase the present input current by a preset increment value in response to the present input current being less than a preset limit current and the present input voltage being greater than or equal to the preset threshold voltage during each polling detection process, until the present input current is greater than or equal to the preset limit current or the present input voltage is less than the preset threshold voltage in the polling detection process, in which the preset limit current represents an upper limit current in the wireless charging process.

In some embodiments, the charging control module 200 is configured to: perform the wireless charging with the preset limit current and its corresponding input voltage in response to the present input current being greater than or equal to the preset limit current, during each polling detection process.

In some embodiments, the charging control module 200 is configured to: perform the wireless charging with the present current equal to an initial current, at the beginning of the wireless charging, in which the initial current is less than the preset limit current.

In some embodiments, the charging control module 200 is configured to: generate identification information once in response to the present input current being less than the preset limit current and the present input voltage being less than the preset threshold voltage, during each polling detection process; and perform the wireless charging with the present input current and the present input voltage in response to continuously generating the identification information for a preset number of times.

In some embodiments, the charging control module 200 is configured to: reset the number of times of previously generating the identification information to zero, in response to a failure in continuously generating the identification information for the preset number of times.

In some embodiments, the wireless charging is configured based on Qi BPP protocol or Qi EPP protocol.

As known from the above description, in the embodiments of the present disclosure, by dynamically polling the current and the voltage in the wireless charging process, when the present input voltage is less than the preset threshold voltage, the subsequent wireless charging process is configured to continue with the present input current and the present input voltage. As a result, the wireless charging can still be carried out even when the coil coupling performance is poor. Hence, the risk of charging interruption is reduced, and the wireless charging effectiveness and stability are improved. Moreover, only when the present input voltage is less than the preset threshold voltage for consecutive preset times, the input current is not further increased, which reduces the risk of misjudgment and improves control accuracy and wireless charging efficiency.

In a third aspect, embodiments of the present disclosure provide an electronic apparatus including: a processor; and a memory having stored therein a computer instruction that is configured to cause the processor to execute the method described in any of the above embodiments.

In a fourth aspect, embodiments of the present disclosure provide a storage medium having stored therein an instruction that is configured to cause a computer to execute the method described in any of the above embodiments.

Figure 7:
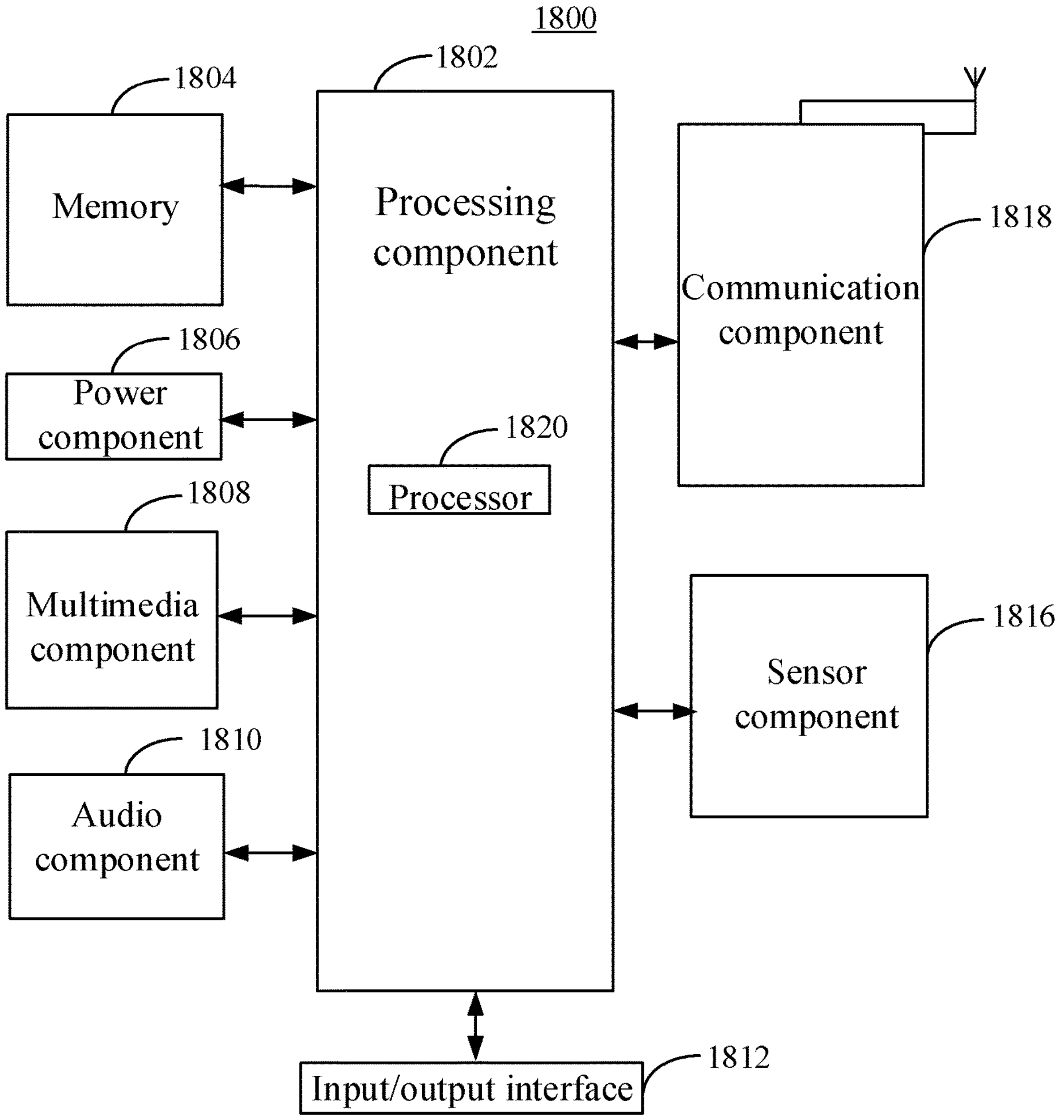
FIG. 7 is a block diagram of an electronic apparatus according to some embodiments of the present disclosure.

FIG. 7 shows a structure of an electronic apparatus 1800 according to some embodiments of the present disclosure. The electronic apparatus according to some embodiments of the present disclosure will be described below with reference to FIG. 7.

Referring to FIG. 7, the electronic apparatus 1800 may include one or more of the following components: a processing component 1802, a memory 1804, a power component 1806, a multimedia component 1808, an audio component 1810, an input/output (I/O) interface 1812, a sensor component 1816, and a communication component 1818.

The processing component 1802 typically controls overall operations of the electronic apparatus 1800, such as the operations associated with display, telephone calls, data communications, camera operations, and recording operations. The processing component 1802 may include one or more processors 1820 to execute instructions to perform all or part of the steps in the above described methods. Moreover, the processing component 1802 may include one or more modules which facilitate the interaction between the processing component 1802 and other components. For instance, the processing component 1802 may include a multimedia module to facilitate the interaction between the multimedia component 1808 and the processing component 1802. As another example, the processing component 1802 can read executable instructions from the memory to implement relevant functions of the electronic apparatus.

The memory 1804 is configured to store various types of data to support the operation of the electronic apparatus 1800. Examples of such data include instructions for any applications or methods operated on the electronic apparatus 1800, contact data, phonebook data, messages, pictures, video, etc. The memory 1804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1806 provides power to various components of the electronic apparatus 1800. The power component 1806 may include a power management system, one or more power sources, and any other components associated with the generation, management, and distribution of power in the electronic apparatus 1800.

The multimedia component 1808 includes a screen providing an output interface between the electronic apparatus 1800 and the user. In some embodiments, the multimedia component 1808 includes a front camera and/or a rear camera. The front camera and the rear camera may receive external multimedia data while the electronic apparatus 1800 is in an operation mode, such as a photographing mode or a video mode. Each of the front camera and the rear camera may be a fixed optical lens system or have focus and optical zoom capability.

The audio component 1810 is configured to output and/or input audio signals. For example, the audio component 1810 includes a microphone ("MIC") configured to receive an external audio signal when the electronic apparatus 1800 is in an operation mode, such as a call mode, a recording mode, and a voice recognition mode. The received audio signal may be further stored in the memory 1804 or transmitted via the communication component 1818. In some embodiments, the audio component 1810 further includes a speaker to output audio signals.

The I/O interface 1812 provides an interface between the processing component 1802 and peripheral interface modules, such as a security keyboard, a click wheel, buttons, and the like. The buttons may include, but are not limited to, a home button, a volume button, a starting button, and a locking button.

The sensor component 1816 includes one or more sensors to provide status assessments of various aspects of the electronic apparatus 1800. For instance, the sensor component 1816 may detect an open/closed status of the electronic apparatus 1800, relative positioning of components, e.g., the display and the security keypad, of the electronic apparatus 1800, a change in position of the electronic apparatus 1800 or a component of the electronic apparatus 1800, a presence or absence of user contact with the electronic apparatus 1800, an orientation or an acceleration/deceleration of the electronic apparatus 1800, and a change in temperature of the electronic apparatus 1800. The sensor component 1816 may include a proximity sensor configured to detect the presence of nearby objects without any physical contact. The sensor component 1816 may also include a light sensor, such as a CMOS or CCD image sensor, for use in imaging applications. In some embodiments, the sensor component 1816 may also include an accelerometer sensor, a gyroscope sensor, a magnetic sensor, a pressure sensor, or a temperature sensor.

The communication component 1818 is configured to facilitate communication, wired or wirelessly, between the electronic apparatus 1800 and other devices. The electronic apparatus 1800 can access a wireless network based on a communication standard, such as Wi-Fi, 2G, 3G, 4G, 5G, 6G or a combination thereof. In an embodiment, the communication component 1818 receives a broadcast signal or broadcast associated information from an external broadcast management system via a broadcast channel. In an embodiment, the communication component 1818 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the electronic apparatus 1800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

The above-mentioned embodiments are merely illustrative for clear explanation, rather than restrictive. For those skilled in the art, other changes or variations in different forms can be made on the basis of the above description. It is unnecessary and impossible to exhaust all the embodiments here. However, the obvious changes or variations derived from the present disclosure are still within the protection scope of the present disclosure.

What is claimed is:

1. A wireless charging control method, applied to an electronic apparatus and comprising:

polling and detecting a present input current and a present input voltage in a wireless charging process performed between an electronic apparatus and a wireless charger; and performing wireless charging with the present input current and the present input voltage in response to the present input voltage being less than a preset threshold voltage, wherein the preset threshold voltage is greater than a cutoff voltage, and the cutoff voltage represents a lower limit voltage for interrupting the wireless charging process, wherein performing wireless charging with the present input current and the present input voltage in response to the present input voltage being less than a preset threshold voltage, comprises:

generating identification information once in response to the present input current being less than the preset limit current and the present input voltage being less than the preset threshold voltage, during each polling detection process; and performing the wireless charging with the present input current and the present input voltage in response to continuously generating the identification information for a preset number of times.

2. The wireless charging control method according to claim 1, further comprising:

increasing the present input current by a preset increment value in response to the present input current being less than a preset limit current and the present input voltage being greater than or equal to the preset threshold voltage during each polling detection process, until the present input current is greater than or equal to the preset limit current or the present input voltage is less than the preset threshold voltage in the polling detection process, wherein the preset limit current represents an upper limit current in the wireless charging process.

3. The wireless charging control method according to claim 2, further comprising:

performing the wireless charging with the preset limit current and its corresponding input voltage in response to the present input current being greater than or equal to the preset limit current, during each polling detection process.

4. The wireless charging control method according to claim 2, further comprising:

performing the wireless charging with the present current equal to an initial current, at a beginning of the wireless charging, wherein the initial current is less than the preset limit current.

5. The wireless charging control method according to claim 1, further comprising:

resetting a number of times of previously generating the identification information to zero, in response to a failure in continuously generating the identification information for the preset number of times.

6. The wireless charging control method according to claim 1, wherein the wireless charging is configured based on Qi BPP protocol or Qi EPP protocol.

7. The wireless charging control method according to claim 1, wherein a time interval between polling detections ranges from 1 second to 2 seconds.

8. An electronic apparatus, comprising:

a processor; and a memory having stored therein a computer instruction that is configured to cause the processor to poll and detect a present input current and a present input voltage in a wireless charging process performed between an electronic apparatus and a wireless charger, and perform wireless charging with the present input current and the present input voltage in response to the present input voltage being less than a preset threshold voltage, wherein the preset threshold voltage is greater than a cutoff voltage, and the cutoff voltage represents a lower limit voltage for interrupting the wireless charging process; and wherein the processor is configured to:

generate identification information once in response to the present input current being less than the preset limit current and the present input voltage being less than the preset threshold voltage, during each polling detection process, and perform the wireless charging with the present input current and the present input voltage in response to continuously generating the identification information for a preset number of times.

9. The electronic apparatus according to claim 8, wherein the processor is configured to:

increase the present input current by a preset increment value in response to the present input current being less than a preset limit current and the present input voltage being greater than or equal to the preset threshold voltage during each polling detection process, until the present input current is greater than or equal to the preset limit current or the present input voltage is less than the preset threshold voltage in the polling detection process, wherein the preset limit current represents an upper limit current in the wireless charging process.

10. The electronic apparatus according to claim 9, wherein the processor is configured to: perform the wireless charging with the preset limit current and its corresponding input voltage in response to the present input current being greater than or equal to the preset limit current, during each polling detection process.

11. The electronic apparatus according to claim 9, wherein the processor is configured to: perform the wireless charging with the present current equal to an initial current, at a beginning of the wireless charging, wherein the initial current is less than the preset limit current.

12. The electronic apparatus according to claim 8, wherein the processor is configured to: reset a number of times of previously generating the identification information to zero, in response to a failure in continuously generating the identification information for the preset number of times.

13. A storage medium having stored therein an instruction that is configured to cause a computer to poll and detect a present input current and a present input voltage in a wireless charging process performed between an electronic apparatus and a wireless charger, and perform wireless charging with the present input current and the present input voltage in response to the present input voltage being less than a preset threshold voltage, wherein the preset threshold voltage is greater than a cutoff voltage, and the cutoff voltage represents a lower limit voltage for interrupting the wireless charging process; and wherein the computer is configured to:

generate identification information once in response to the present input current being less than the preset limit current and the present input voltage being less than the preset threshold voltage, during each polling detection process, and perform the wireless charging with the present input current and the present input voltage in response to continuously generating the identification information for a preset number of times.

14. The storage medium according to claim 13, wherein the computer is configured to:

increase the present input current by a preset increment value in response to the present input current being less than a preset limit current and the present input voltage being greater than or equal to the preset threshold voltage during each polling detection process, until the present input current is greater than or equal to the preset limit current or the present input voltage is less than the preset threshold voltage in the polling detection process, wherein the preset limit current represents an upper limit current in the wireless charging process.

15. The storage medium according to claim 14, wherein the computer is configured to: perform the wireless charging with the preset limit current and its corresponding input voltage in response to the present input current being greater than or equal to the preset limit current, during each polling detection process.

16. The storage medium according to claim 14, wherein the computer is configured to: perform the wireless charging with the present current equal to an initial current, at a beginning of the wireless charging, wherein the initial current is less than the preset limit current.

17. The storage medium according to claim 13, wherein the computer is configured to: reset a number of times of previously generating the identification information to zero, in response to a failure in continuously generating the identification information for the preset number of times.

* * * * *